(12) United States Patent
Sloane

(10) Patent No.: US 7,877,986 B2
(45) Date of Patent: Feb. 1, 2011

(54) METHOD AND APPARATUS FOR GENERATING A REDUCTANT IN AN EXHAUST GAS OF A COMPRESSION-IGNITION ENGINE

(75) Inventor: Thompson M. Sloane, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 691 days.

(21) Appl. No.: 11/744,396

(22) Filed: May 4, 2007

(65) Prior Publication Data

US 2008/0271434 A1    Nov. 6, 2008

(51) Int. Cl.
*F02B 27/04*    (2006.01)
*F01N 3/00*    (2006.01)
*F01N 3/10*    (2006.01)

(52) U.S. Cl. .............................. 60/295; 60/274; 60/285; 60/286; 60/301

(58) Field of Classification Search .................... 60/285, 60/286, 301, 273, 295, 299, 303, 274
See application file for complete search history.

(56) References Cited

U.S. PATENT DOCUMENTS

| 6,029,623 | A | 2/2000 | Weissman et al. |
| 6,532,736 | B2 | 3/2003 | Hammerle et al. |
| 6,708,484 | B2 | 3/2004 | Onodera et al. |
| 6,792,751 | B2 | 9/2004 | Kokusyo et al. |
| 6,848,413 | B1 * | 2/2005 | Suder et al. .................. 123/286 |
| 7,082,753 | B2 | 8/2006 | Dalla Betta et al. |
| 2002/0054844 | A1 | 5/2002 | Pfeifer et al. |
| 2004/0083722 | A1 | 5/2004 | Simpson et al. |
| 2006/0201468 | A1 | 9/2006 | Lancaster et al. |
| 2006/0288691 | A1 * | 12/2006 | Coleman et al. .............. 60/286 |

OTHER PUBLICATIONS

Kass,M; Selective Catalytic Reduction of Diesel NOx Emissions using Ethanol as a Reductant; USDOE 9th DEER Conf; Aug. 2003; Newport RI USA; pp. 1-8.*
Hofmann, Franz; Alternative Fuels; Archived Oct. 2002; pp. 3-4.*
Brian West et al., In-Cylinder Production of Hydrogen During Net-Lean Diesel Operation, Apr. 2006, SAE International, pp. 1-7.*
Brian West et al., In-Cylinder Production of Hydogen During Net-Lean Diesel Operation Abstract, Apr. 2006, SAE International, p. 1.*
Kass,M; Selective Catalytic Reduction of Diesel NOx Emissions using Ethanol as a Reductant; USDOE 9th DEER Conf; Aug. 2003; Newport RI USA.
Twigg,M; Automotive Exhaust Emissions Control; Platinum Metals Rev, 2003, 47,(4),157-162.
Lee,JH; HC Reaction pathway in Selective NO reduction over a bifunctional SnO2/Al2O3 Catalyst;Chem Commun. 2001, 1404-1405; Royal Soc. of Chem, UK.

* cited by examiner

*Primary Examiner*—Thomas E Denion
*Assistant Examiner*—Audrey Klasterka

(57) ABSTRACT

A method and apparatus are provided for generating a reductant in an exhaust gas feedstream of a compression-ignition internal combustion engine upstream of a hydrocarbon-selective catalytic reduction catalyst. The method comprises injecting a quantity of fuel into the exhaust gas subsequent to a combustion event whereat a temperature of the exhaust gas is in a range of 670 K to 1100 K at a start of the injection. The generated reductant comprises an active species including an oxygenated fuel species.

17 Claims, 2 Drawing Sheets

METHOD AND APPARATUS FOR GENERATING A REDUCTANT IN AN EXHAUST GAS OF A COMPRESSION-IGNITION ENGINE

TECHNICAL FIELD

This invention pertains generally to internal combustion engines and exhaust aftertreatment.

BACKGROUND OF THE INVENTION

The statements in this section merely provide background information related to the present disclosure and may not constitute prior art.

Manufacturers of internal combustion engines are continually developing new engine control strategies to satisfy customer demands and meet various regulations. One such engine control strategy comprises operating an engine at an air/fuel ratio that is lean of stoichiometry to improve fuel economy and reduce greenhouse gas emissions. Such engines include both compression-ignition (diesel) and lean-burn spark-ignition engines. When an engine operates in a region lean of stoichiometry, combustion temperatures typically increase, leading to increased $NO_X$ emissions. One proposed type exhaust aftertreatment system and control strategy for managing and reducing $NO_X$ emissions includes injection of a reductant into an exhaust gas feedstream upstream of a hydrocarbon-selective catalytic reduction ('HC-SCR') catalytic device to cause a reduction of $NO_X$ exhaust gases to nitrogen and oxygen across the HC-SCR device, among other gases.

Currently, proposed systems for injecting reductants for selective catalyst reduction of $NO_X$ require additional hardware and control schemes to accomplish such operation. An example of such a system includes injection of diesel fuel into the exhaust stream. The effectiveness of this method decreases significantly below a catalyst temperature of about 350° C. at low catalyst space velocity, and this minimum temperature of satisfactory catalyst effectiveness increases with increasing space velocity. The method also requires a separate fuel injector mounted in the exhaust system. Another example includes injection of ammonia into the exhaust feedstream upstream of a reduction catalyst. There are infrastructure-related problems associated with storage, transport, and handling of ammonia for a large fleet. Furthermore, un-reacted ammonia may pass through the SCR and be exhausted into the atmosphere. Another example comprises use of urea as a reductant for selective catalytic reduction. Such a system requires replenishing urea on-board the vehicle, which requires an infrastructure to distribute the urea. Furthermore, the freezing point of the urea solution is −12° C., presenting a problem for its use in cold climates. Another example comprises use of $NO_X$ storage catalysts. These catalysts can be effective, but they typically require a large catalyst volume and a substantial mass of expensive platinum-group metals (e.g., Pt, Pd, and Rh) in combination with extremely low sulfur fuel and periodic intrusive operation of the engine to regenerate the catalyst, thus reducing the effective fuel economy of the vehicle.

Hydrocarbon-selective catalytic reduction (HC-SCR) is a technology for reducing emissions of nitrogen oxides in lean exhaust, such as diesel exhaust. One of the significant challenges of implementing HC-SCR is to develop a system that allows sufficient reduction of $NO_X$ emissions over the range of exhaust temperatures found in diesel engines at the speeds and loads experienced during typical, every-day operation. Furthermore, it is desirable that the hydrocarbon reductant be present on the vehicle. One source of reductant is the exhaust itself, but typical hydrocarbons present in engine exhaust are generally less active than diesel fuel. The use of diesel fuel and selected diesel fuel-component hydrocarbons as the reductant has been explored by several investigators. Results indicate that the $NO_X$ reduction efficiency of HC-SCR catalysts can be greatly improved if appropriate active hydrocarbon species are used. The most effective active species appear to be oxygenated hydrocarbons, such as acetaldehyde and formaldehyde. These oxygenated species are produced by low-temperature oxidation of long, straight-chain alkane hydrocarbons of the type that are present in diesel fuel. Also, long, straight-chain alkenes are produced by low-temperature oxidation of these same alkanes, and have been found to be more effective reductants than the long, straight-chain alkanes in some studies.

A system that results in adequate reduction of $NO_X$ emissions over a range of exhaust temperatures typically found in diesel engines at the speeds and loads experienced in everyday driving, i.e., 200° C.-500° C., is desirable. A number of hydrocarbons have been shown to be effective for the reduction of $NO_X$ over silver-alumina ($Ag/Al_2O_3$) and barium-yttria (BaY) zeolite catalysts, including long straight-chain alkane hydrocarbons, alkene hydrocarbons, and diesel fuel, as well as alcohols and aldehydes.

Hydrocarbons present in diesel and gasoline engine exhaust such as methane, ethane, propene, and propane require high temperatures for adequate $NO_X$ conversion, and are generally not suitable for HC-SCR. Long straight-chain alkane hydrocarbons such as n-octane and n-decane that are present in diesel fuel require somewhat lower temperatures for adequate $NO_X$ conversion compared to the lighter hydrocarbons. This observation has led to the use of diesel fuel and long straight-chain alkane hydrocarbons as the $NO_X$ reductant in a number of studies. These studies have shown, however, that diesel fuel as well as long, straight-chain hydrocarbons are only adequate above a catalyst temperature of about 300° C. (573K) and low catalyst space velocity. Further work has shown that alcohols and aldehydes can reduce $NO_X$ at catalyst temperatures as low as 200 to 250° C. (473 K to 523K). Long, straight-chain alkene hydrocarbons have been found to be effective at temperatures as low as 250 to 300° C. (523K to 573K). However, these species are not readily available in engine exhaust streams. A method for producing these species on-board the vehicle that leads to efficient selective reduction of $NO_X$ over the entire desired exhaust temperature range is desireable.

It has been reported that the peak temperature for $NO_X$ conversion using diesel fuel can be reduced by injecting the diesel fuel into a region upstream of the catalyst that has been preheated to 400° C. (673K) while maintaining a lower catalyst temperature. Peak $NO_X$ conversion efficiencies have been obtained at catalyst temperatures near 300° C. (573K) with this method. It was believed that the diesel fuel was partially oxidized at 400° C. (673K) to form species that were more effective for HC-SCR than diesel fuel by itself. The drawback to this method, however, is that supplemental heating of the exhaust may not be suitable for practical engine exhaust systems on a vehicle. A sufficiently high temperature for the partial oxidation of diesel fuel is available in the engine cylinder, however. A method to take advantage of this higher temperature to prepare partial oxidation products for use in exhaust HC-SCR can be useful.

Thus, there is a need for a method and system for generating a reductant comprising oxygenated hydrocarbons and long, straight-chain alkenes for use in selective catalytic

SUMMARY OF THE INVENTION

In accordance with an embodiment of the invention, a method and apparatus for generating a reductant in an exhaust gas feedstream of a compression-ignition internal combustion engine upstream of a hydrocarbon-selective catalytic reduction catalyst is provided. The method comprises injecting a quantity of fuel into the combustion chamber subsequent to a combustion event whereat a temperature of the in-cylinder burned gas is less than 1100 K at a start of the injection. The generated reductant comprises an oxygenated fuel species, e.g., an aldehyde or a long, straight-chain alkene hydrocarbon.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF THE INVENTION

Figure 1:
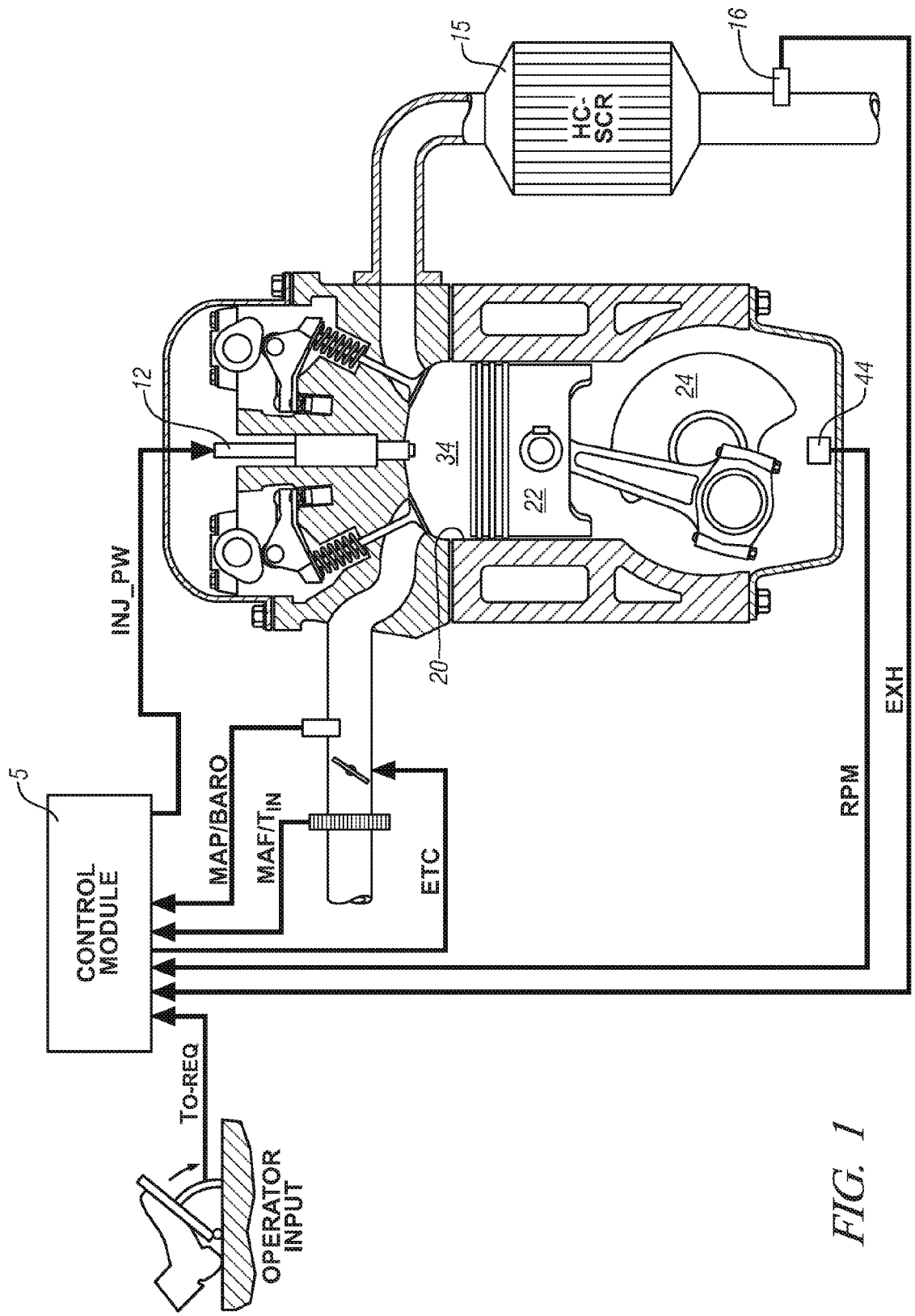
FIG. 1 is a schematic diagram of a powertrain system, in accordance with the present invention; and, FIGS. 2 and 3 are datagraphs, in accordance with the present invention.

Referring now to the drawings, wherein the showings are for the purpose of illustrating the invention only and not for the purpose of limiting the same, FIG. 1 comprises a schematic diagram depicting an internal combustion engine 10, exhaust aftertreatment system 15, and control module 5, in accordance with an embodiment of the present invention.

The exemplary engine 10 comprises a direct-injection, compression-ignition, internal combustion engine employing a four-stroke operation wherein each engine combustion cycle comprises 720 degrees of angular rotation of a crankshaft 24 divided into four 180-degree stages of intake-compression-expansion-exhaust, which are descriptive of reciprocating movement of pistons 22 in each engine cylinder 20. The engine preferably has an operating regime that is primarily lean of stoichiometry. The skilled practitioner understands that the invention is applicable to other engine configurations that operate primarily lean of stoichiometry, e.g., homogeneous-charge compression-ignition engines, lean-burn spark-ignition engines, and two-stroke engine configurations. The reciprocating pistons are attached to the crankshaft, which is operably attached to a vehicle transmission and driveline to deliver tractive torque thereto. During ongoing operation of the compression-ignition engine, a combustion event occurs during each engine cycle when fuel is injected into the combustion chamber during the compression stroke, leading to ignition of the injected fuel. In-cylinder burned gases are generated due to incomplete combustion of the fuel and air mixture, which become exhaust gases when passed out of the combustion chamber with opening of the engine exhaust valves. The exhaust gas is made up of regulated constituent elements preferably transformed by the aftertreatment system to inert gases, typically including hydrocarbons ('HC'), carbon monoxide ('CO'), nitrogen oxides ('$NO_X$'), and particulate matter ('PM'), among others. The engine includes sensing devices to monitor engine operation, and actuators which control engine operation. The sensing devices and actuators are signally or operatively connected to control module 5.

The sensing devices are installed on or near the engine to monitor physical characteristics and generate signals which are correlatable to engine and ambient parameters. The sensing devices preferably comprise a crank sensor 44 for monitoring crankshaft speed (RPM), a manifold pressure sensor for monitoring manifold pressure (MAP) and ambient pressure (BARO), a mass air flow sensor for monitoring intake mass air flow (MAF) and intake air temperature ($T_{IN}$), and, an exhaust gas sensor 16 for monitoring states of one or more exhaust gas parameters, e.g., temperature, air/fuel ratio, and constituents (EXH). One skilled in the art understands that there can be one or more sensing devices and methods for monitoring exhaust gas before, in the middle of, and after the exhaust aftertreatment system for purposes of control and diagnostics. Operator input, in the form of an operator torque request ($T_{O\_REQ}$) is typically obtained through a throttle pedal and a brake pedal, among other devices. The engine is preferably equipped with other sensors (not shown) for monitoring operation and for purposes of system control. Each of the sensing devices is signally connected to the control module 5 to provide signal information which is transformed by the control module to information representative of the respective monitored parameter. It is understood that this configuration is illustrative, not restrictive, including the various sensing devices being replaceable within functionally equivalent devices and algorithms and still fall within the scope of the invention.

The actuators are installed on the engine and controlled by the control module in response to operator inputs to achieve various performance goals. Actuators include an electronically-controlled throttle device which controls throttle opening to a commanded input (ETC), and a fuel injector 12 for directly injecting fuel into each of the combustion chambers in response to a commanded input (INJ_PW), all of which are controlled in response to the operator torque request ($T_{O\_REQ}$). Other engine system components (not shown) may include an intake air compressing device, e.g., a variable geometry turbine device and air compressor, a charge air cooler, an exhaust gas recirculation (EGR) valve and cooler, and, intake/exhaust valve control and management systems, among others.

The exhaust aftertreatment system 15 comprises an integrated system for converting the constituent elements of the exhaust gas to inert gases. The exhaust aftertreatment system is preferably constructed of a plurality of devices which employ technologies having various capabilities for treating the constituent elements of the exhaust gas of the engine, including, e.g., selective catalyst reduction, oxidation, and particulate filtering. The devices are preferably fluidly connected in series using known pipes and connectors. The exhaust manifold entrains and directs exhaust gas flow to the exhaust aftertreatment system.

The selective catalyst reduction device of the aftertreatment system 15 comprises a hydrocarbon-selective catalyst reduction ('HC-SCR') device that is directly fluidly connected to the exhaust manifold of the engine and receives exhaust gas flowing therefrom, and flows the exhaust gas therethrough to other aftertreatment devices (not shown) downstream. Exemplary HC-SCR catalysts include alumina catalysts, silver-alumina ($Ag/Al_2O_3$) catalysts, and barium- and sodium-yttria zeolite catalysts. The selected HC-SCR catalyst is incorporated with a suitable washcoat for impregnation upon a ceramic or metal substrate having flow-through characteristics, e.g., a honeycomb configuration. The impregnated substrate is assembled into a stainless steel metal assembly having an inlet and an outlet, to form the HC-SCR device. The HC-SCR device has physical characteristics including size, volume, space velocity and flow restriction appropriate to the specific engine and vehicle to which it is applied. Other devices of the exhaust aftertreatment system 15 may comprise, e.g., an oxidation catalyst device and a diesel particulate filter device ('DPF'), determined accordingly during vehicle development, and placed downstream of the HC-SCR device.

The control module 5 is preferably an element of a distributed control system comprising a plurality of control modules adapted to provide coordinated control of the various vehicle systems including the powertrain system described herein. The control module is operable to monitor inputs from sensing devices, synthesize pertinent information, and execute algorithms to control various actuators to achieve control targets, including such parameters as fuel economy, emissions, performance, driveability, and protection of hardware. The control module is operably connected, either directly or through the control system, to a plurality of other devices through which a vehicle operator typically controls or directs operation of the vehicle and powertrain. Exemplary devices through which the vehicle operator controls or directs the operation of the powertrain include the throttle and brake pedals, a transmission gear selector, and, vehicle speed cruise control.

The control module 5 comprises a central processing unit signally electrically connected to volatile and non-volatile memory devices via data buses. The control module is preferably a general-purpose digital computer generally comprising a microprocessor or central processing unit, storage mediums comprising random access memory (RAM), non-volatile memory devices including read only memory (ROM) and electrically programmable read only memory (EPROM), high speed clock, analog to digital (A/D) and digital to analog (D/A) circuitry, and input/output circuitry and devices (I/O) and appropriate signal conditioning and buffer circuitry. Control algorithms, comprising resident program instructions and calibrations, are stored in the non-volatile memory devices and executed to provide the respective functions. Algorithms are typically executed during preset loop cycles such that each algorithm is executed at least once each loop cycle. Algorithms are executed by one of the central processing units to monitor inputs from the sensing devices and execute control and diagnostic routines to control operation of the respective device. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

The invention comprises a method, preferably executed as one or more algorithms in the control module, to generate reductants comprising active species, including oxygenated hydrocarbon and straight-chain alkene hydrocarbon reductants, in the exhaust gas feedstream of the engine 10 upstream of the exhaust aftertreatment system 15, specifically the HC-SCR device. The method comprises injecting a quantity of hydrocarbon-based fuel into the combustion chamber 34 to mix with the in-cylinder burned gas subsequent to a combustion event at an appropriate time such that temperature of the burned gas whereat the fuel is being injected is within a temperature range between about 670 K and 1100 K at the start of the injection. Injection of additional fuel at an appropriate period of time during the expansion stroke leads to partial oxidation reactions of the fuel to produce the active hydrocarbon species. These species are then exhausted from the cylinder, and flow in the exhaust gas feedstream to the HC-SCR device to achieve high $NO_X$ conversions across the HC-SCR device over a wide range of temperatures.

Injecting the fuel in the range of temperatures from 670 K to 1100 K produces oxygenates and other particularly active species for hydrocarbon selective catalytic reduction of engine-out $NO_X$ species in the exhaust gas feedstream. The active species include, but are not limited to, oxygenates such as ethanol, formaldehyde, acetaldehyde; and straight-chain and straight-chain alkene hydrocarbon such as 1-butene and 1-octene. The preferred fuel can be any convenient hydrocarbon fuel, including but not limited to gasoline or diesel fuel.

The temperature required for partial oxidation of hydrocarbon fuels is typically available in the engine during the late part of the expansion stroke. In-cylinder temperatures in the range of 670 K to 1100 K are found during expansion, which has been proven to be an ideal temperature range for partial oxidation to occur. When fuel is injected too early during the expansion stroke, the temperature is high enough so that near-complete oxidation of the injected fuel occurs, with little or no production of the desired oxygenated species. When fuel is injected too late, there may be insufficient in-cylinder residence time and/or insufficient temperature for formation of the desired active species in the engine cylinder, although residence in the exhaust manifold and system can result in adequate residence time to partially oxidize the hydrocarbon fuel when the system is operating at sufficiently high temperatures. Therefore, in an operating condition during which the temperature is sufficiently high but the in-cylinder residence time is too short, it is still possible to continue to form desired active species in the exhaust stream following late injection.

Figure 2:
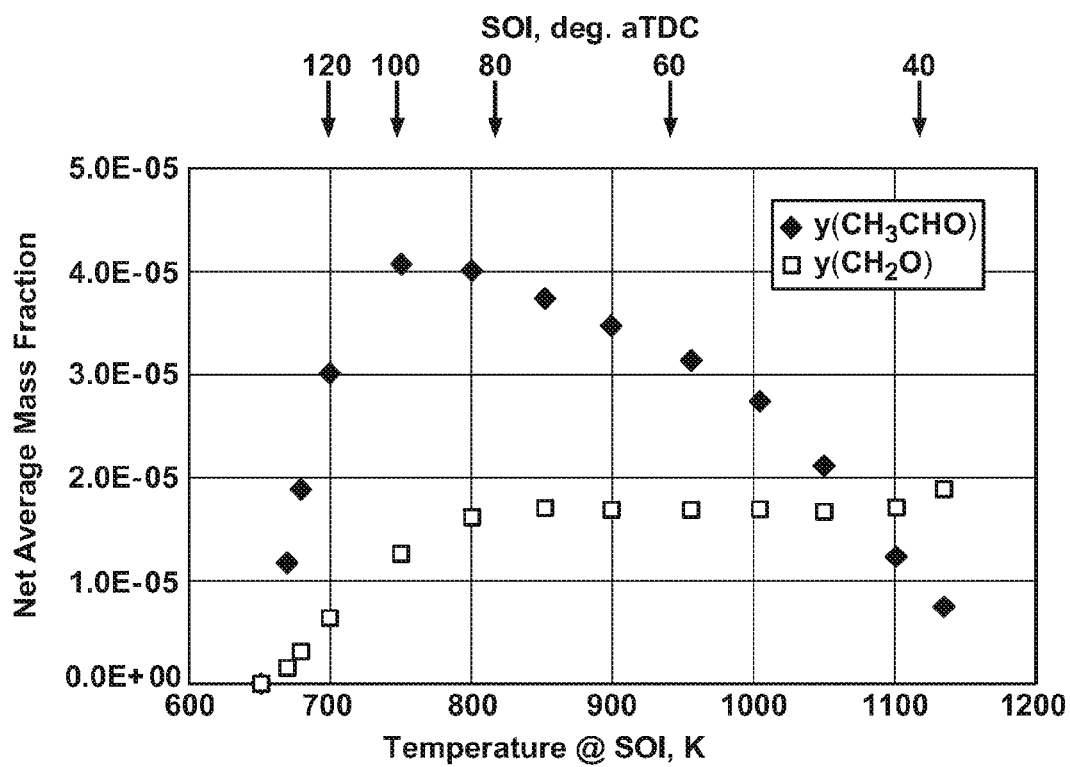
Figure 3:
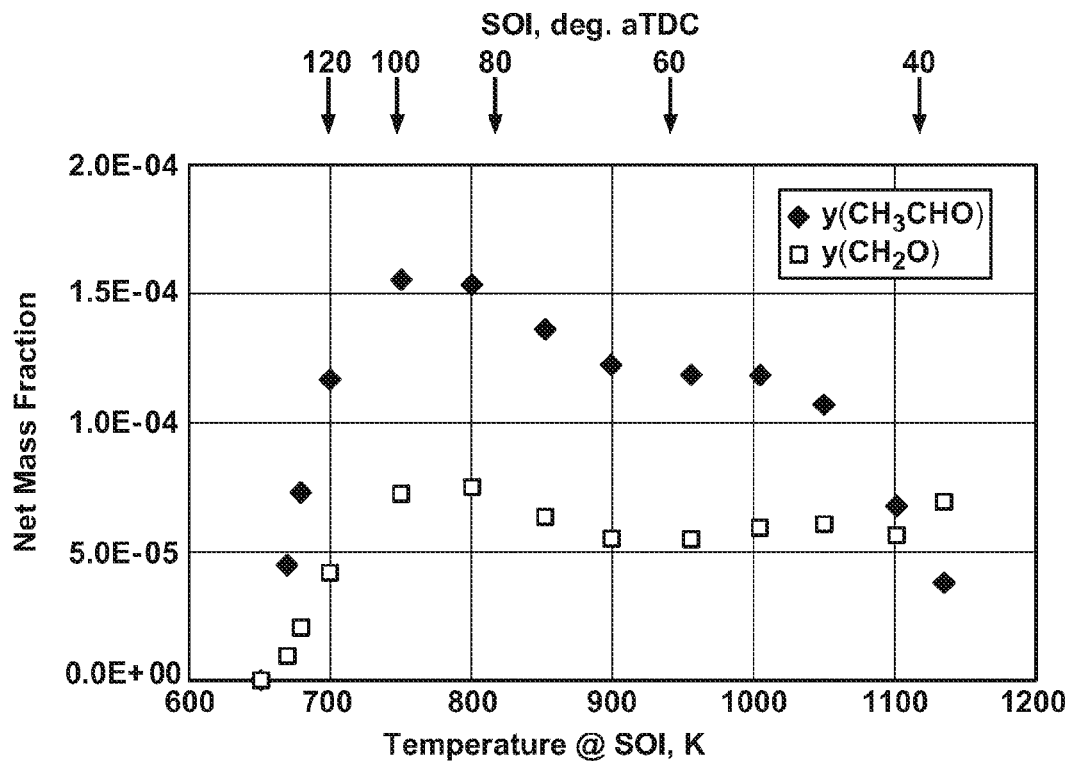

Referring now to FIGS. 2 and 3, results obtained from chemical kinetic modeling of diesel engine combustion are depicted to demonstrate results from injecting n-heptane into the engine cylinder well after top dead center (aTDC) of the combustion phase but before the exhaust valve opens (EVO), which occurs at or about 170 degrees after top-dead-center (deg. aTDC). The substance n-heptane comprises a diesel fuel surrogate. These results indicate that partial oxidation of the n-heptane occurs when it is injected at an appropriate time during the expansion stroke. This partial oxidation produces significant quantities of oxygenated hydrocarbons as well as straight-chain alkene hydrocarbons. Comparable results are to be expected with other components of diesel fuel, such as n-decane, n-dodecane, and n-pentadecane, as well as with diesel fuel itself. This is because the partial oxidation chemistry of these molecules is very similar to that of n-heptane.

Engine operating conditions for the results obtained with reference to FIGS. 2 and 3 are provided in Table 1, below:

TABLE 1

| Parameter | Operating Condition |
|---|---|
| Initial pressure, bar | 1.0 |
| Initial temperature, K | 323 |
| Residual, mole % | 39.5 |
| Main fuel charge, mg | 17 |
| Equivalence Ratio | 0.5 |
| Engine Speed | 1500 rpm |
| IMEP, bar | 4.73 |
| Final $O_2$ mass % | 11.3 |
| CA10, deg. aTDC | −11.9 |
| CA50, deg. aTDC | 4.4 |
| NO mass fraction @ 40 deg. | 6.0E−05 |

TABLE 1-continued

| Parameter | Operating Condition |
|---|---|
| aTDC | |
| $NO_2$ mass fraction @ 40 deg. aTDC | 2.5E−05 |

Referring again to FIG. 2, results of late injection of an amount of fuel equal to 1% of the original fuel charge (0.17 mg) for various injection timings are provided, in terms of a net average mass fraction of formaldehyde, depicted as $y(CH_2O)$, and acetaldehyde, depicted as $y(CH_3CHO)$ in the exhaust gas plotted as a function of exhaust gas temperature at start of injection (Temperature@SOI, K). Timing of start-of-injection (SOI), in units of deg. aTDC, is indicated for the various operating points. The results depict the net average mass fractions (actual average mass fractions minus the average mass fractions without fuel injection) of formaldehyde and acetaldehyde at the end of the calculation, as a function of the in-cylinder temperature at the start of injection (SOI). The maximum in the acetaldehyde yield is obtained near an average temperature of 750 K at the time of the start of injection, corresponding to SOI=101 deg. aTDC. The formaldehyde yield is less than the acetaldehyde yield over almost the entire temperature range. However, between 1050 K (SOI=48 deg. aTDC) and 1136 K (SOI=40 deg. aTDC) the net formaldehyde mass fraction becomes higher than that for acetaldehyde, due to an increase in the formaldehyde mass fraction coupled with a decrease in the acetaldehyde mass fraction as the average temperature at SOI increases. These results are obtained for 1% of the engine fueling, i.e., 0.17 mg of fuel, being injected during the expansion stroke of every cycle in every engine cylinder at this operating condition. Currently available production fuel injectors may lack a dynamic control range and minimum controllable flowrate of injected fuel to accurately meter fuel injection at this low flow rate.

Referring again to FIG. 3, results of late injection of an amount of fuel are depicted for injecting 1.0 mg of fuel during expansion in one out of each six combustion events to provide the same amount of late-injected fuel as described with reference to FIG. 2. This injection rate is more likely within the dynamic control range of a typical production fuel injector. The results comprise a net average mass fraction of formaldehyde, $y(CH_2O)$, and acetaldehyde, $y(CH_3CHO)$, in the exhaust gas plotted as a function of exhaust gas temperature at start of injection (Temperature@SOI, K). Timing of start-of-injection (SOI), in units of deg. aTDC, is indicated for the various operating points. The results of FIG. 3 indicate that the net mass fraction of formaldehyde and acetaldehyde produced by injection of this fuel quantity at various injection timings. The peak acetaldehyde mass fraction is about a factor of four larger than that showed in FIG. 2, where one-sixth of the amount of fuel was injected during each combustion event. The carbon atom acetaldehyde and formaldehyde yields are 8.8% and 3.1% respectively, with 1 mg injected at SOI=86 deg. (T=801 K at SOI), compared to 13.4% and 3.9% with 0.17 mg injected. The data indicate that residence time for the reactions producing these species results are nearly complete at the conditions that exist in the cylinder. Thus, there is a need for a residence time of about nine milliseconds before EVO for effective oxidation of the fuel in the combustion chamber at these conditions. Significant net production of another active reductant, 1-heptene, occurs over the same range of temperatures as is shown for acetaldehyde and formaldehyde in FIGS. 2 and 3.

Injecting the mass of hydrocarbon into the combustion chamber comprises controlling timing and mass of injection as described above. The preferred required mass is about 1% of total mass injected into a single cylinder for a single combustion cycle, to produce the desired active species in every engine cycle. The preferred required mass may vary, depending upon specific configuration of an engine. Timing of injection is based upon reaching the range of temperatures of 670 K to 1100 K at the start of injection. The timing of injection preferably comprises a predetermined calibration based upon measurable engine parametric states, e.g., speed and load/torque output, often indicated by injected fuel mass in a compression-ignition engine. The calibration is generated during engine development, wherein an engine is operated over the ranges of speeds and loads, with exhaust temperatures being monitored and correlated to engine crankshaft position. The results are reduced to a two-dimensional array that is stored in the control module and referenced by the control algorithm during ongoing engine operation. The quantity of fuel injected, and the repetition rate, i.e., executing a post-combustion injection event once every X number of cylinder combustion events, can be determined based upon the minimum controllable flowrate of the fuel injector. An upper limit for injected fuel quantity can determined, based upon conditions related to ability to produce the desired active species in every engine cycle, fuel economy, engine combustion stability and vibration, and other factors.

It is understood that the specific injection timing for a given configuration is determined to correspond to a time when the in-cylinder or exhaust gas temperature is in the approximate range of 670 K to 1100 K, to effect partial oxidation of the injected fuel to form the particularly active species as described above. These species act as the reductant for conversion of nitrogen oxides to molecular nitrogen in the HC-SCR device at catalyst temperatures as low as 200 to 250° C. At this catalyst temperature, diesel fuel itself, when injected into the exhaust upstream of the HC-SCR catalyst, is less effective as a reductant in HC-SCR. This invention facilitates efficient selective $NO_X$ reduction to occur over a wide range of exhaust temperatures, and hence a wider range of speed and load conditions. The benefits of such operation include improved HC-SCR performance (higher $NO_X$ conversion) at low exhaust temperatures, and potential to reduce volume, mass, and cost of the exhaust aftertreatment devices.

The invention has been described with specific reference to the embodiments and modifications thereto. Further modifications and alterations may occur to others upon reading and understanding the specification. It is intended to include all such modifications and alterations insofar as they come within the scope of the invention.

Having thus described the invention, it is claimed:

1. A method for generating an active-species hydrocarbon reductant in a compression-ignition internal combustion engine configured to flow exhaust gas through a hydrocarbon-selective catalytic reduction catalyst, comprising: injecting a quantity of engine fuel into a combustion chamber of the engine during an expansion stroke subsequent to a combustion event whereat a temperature of in-cylinder burned gas is less than 1100 K at a start of the injection and whereat the engine fuel is resident in the combustion chamber for a period of about nine milliseconds before opening an exhaust valve of the combustion chamber.

2. The method of claim 1, wherein the start of the injection is based upon a predetermined calibration of engine operating conditions comprising engine speed and load and the temperature of the in-cylinder burned gas.

3. The method of claim 1, wherein the quantity of engine fuel into a combustion chamber of the engine during the expansion stroke subsequent to the combustion event comprises an amount equal to about one percent of a quantity of fuel injected during each engine cycle to meet engine operating conditions comprising engine speed and load.

4. The method of claim 1, wherein injecting the quantity of engine fuel into the combustion chamber of the engine during the expansion stroke comprises injecting a quantity of fuel once every X cycles, the quantity comprising about X percent of the fuel injected during each engine cycle to meet engine operating conditions comprising engine speed and load.

5. The method of claim 1, further comprising injecting the quantity of engine fuel into the combustion chamber of the engine during the expansion stroke subsequent to the combustion event whereat the temperature of the in-cylinder burned gas is within a range between 670 K and 1100 K at the start of the injection.

6. The method of claim 1, wherein generating the active-species hydrocarbon reductant comprises generating one of an oxygenated hydrocarbon species and a straight-chain olefin.

7. The method of claim 6, wherein the oxygenated hydrocarbon species comprises one of acetaldehyde and formaldehyde.

8. The method of claim 1, wherein generating the active-species hydrocarbon reductant further comprises generating an alkene hydrocarbon species.

9. The method of claim 8, wherein the alkene hydrocarbon species comprises one of 1-octene, 1-nonene, 1-decene, and, 1-dodecene.

10. A method for reducing $NO_X$ emissions of an engine operating lean of stoichiometry, comprising:
   providing a hydrocarbon-selective catalytic reduction catalyst in a device configured to receive flow of exhaust gas directly from the engine; and,
   injecting a quantity of engine fuel into a combustion chamber of the engine during an expansion stroke subsequent to a combustion event whereat a temperature of the in-cylinder burned gas is less than 1100 K at a start of the injection and whereat the engine fuel is resident in the combustion chamber for a period of about nine milliseconds before opening an exhaust valve of the combustion chamber, the engine fuel and in-cylinder burned gas generating an active species hydrocarbon reductant; and,
   reducing $NO_X$ emissions to inert gases across the hydrocarbon-selective catalytic reduction catalyst using the active species hydrocarbon reductant.

11. The method of claim 10, wherein the active species hydrocarbon reductant in the exhaust gas comprises one of acetaldehyde and formaldehyde.

12. The method of claim 10, wherein the start of the injection of the quantity of engine fuel in the combustion chamber during the expansion stroke subsequent to the combustion event whereat the temperature of the in-cylinder burned gas is less than 1100 K is based upon a predetermined calibration of engine operating conditions comprising engine speed and load and the temperature of the in-cylinder burned gas.

13. The method of claim 12, wherein injecting the quantity of fuel into the combustion chamber further comprises injecting an amount of fuel every X cycles wherein the quantity of fuel comprises an amount equal to about X percent of fuel quantity injected each engine cycle to meet the engine operating conditions comprising engine speed and load.

14. An apparatus, comprising:
   a direct-fuel injection, compression-ignition internal combustion engine having a plurality of sensors and actuators;
   a hydrocarbon-selective catalytic reduction catalyst assembled in a device directly fluidly connected to an exhaust manifold of the engine, and, operative to flow exhaust gas therethrough;
   a control module, comprising an electronic device adapted to monitor inputs from the sensors and execute predetermined programs reduced to machine code to control the actuators;
   the control module adapted to control an engine fuel injector to inject a quantity of fuel into a combustion chamber of the engine during an expansion stroke subsequent to a combustion event whereat a temperature of in-cylinder burned gas is less than 1100 K at the start of the injection and whereat the engine fuel is resident in the combustion chamber for a period of about nine milliseconds before opening an exhaust valve of the combustion chamber to generate an active species hydrocarbon reductant.

15. The apparatus of claim 14, wherein the hydrocarbon-selective catalytic reduction catalyst comprises one of an alumina catalyst, a silver-alumina catalyst, a barium zeolite catalyst, and a sodium-yttria zeolite catalyst.

16. The apparatus of claim 14, further comprising the control module configured to control the engine fuel injector to inject the quantity of fuel into the combustion chamber of the engine during an expansion stroke subsequent to a combustion event whereat a temperature of in-cylinder burned gas is within a range between 670 K and 1100 K at the start of the injection to generate the active species hydrocarbon reductant therein.

17. The apparatus of claim 16, wherein the active species hydrocarbon reductant comprises an oxygenated species reductant comprising one of acetaldehyde and formaldehyde.

* * * * *